(12) United States Patent
Marceau (10) Patent No.: US 7,818,804 B2
(45) Date of Patent: Oct. 19, 2010

(54) EMPIRICAL PRIVILEGE PROFILER (EPP) FOR SOFTWARE PROGRAMS

(75) Inventor: Carla Marceau, Ithaca, NY (US)

(73) Assignee: Architecture Technology Corporation, Eden Prairie, MN (US)

( * ) Notice: Subject to any disclaimer, the term of this patent is extended or adjusted under 35 U.S.C. 154(b) by 1034 days.

(21) Appl. No.: 11/496,252

(22) Filed: Jul. 31, 2006

(65) Prior Publication Data

US 2008/0047010 A1 Feb. 21, 2008

(51) Int. Cl.
*G06F 12/14* (2006.01)
(52) U.S. Cl. ........................................................ 726/23
(58) Field of Classification Search ........................ None
See application file for complete search history.

(56) References Cited

U.S. PATENT DOCUMENTS

2002/0184486 A1* 12/2002 Kershenbaum et al. ..... 713/150

\* cited by examiner

*Primary Examiner*—Brandon S Hoffman
(74) *Attorney, Agent, or Firm*—Shumaker & Sieffert, P.A.

(57) ABSTRACT

A system is described for dynamically generating an application-specific, system-level privilege profile that describes the aggregate exercise of system-level privileges by a plurality of software application instances. In particular, the system includes a plurality of client computing devices for capturing empirical information relating to the exercise of privileges by the plurality of software application instances executing on top of a plurality of instances of a platforms residing within the plurality of client devices. The plurality of client devices each uploads the empirical information to an EPP server, which is also included within the system. The empirical privilege profiler system dynamically generates the profile based the empirical information. In this way, the system may facilitate adherence to the Principle of Least Privilege by revealing system-level privilege use by an application, monitoring of system-level privilege use, and detection of system intrusions.

53 Claims, 6 Drawing Sheets

EMPIRICAL PRIVILEGE PROFILER (EPP) FOR SOFTWARE PROGRAMS

STATEMENT REGARDING FEDERALLY SPONSORED RESEARCH OR DEVELOPMENT

This invention was made with Government support under Contract W3IP4Q-06-C-0134, awarded by DARPA. The Government has certain rights in this invention.

TECHNICAL FIELD

The invention relates to computer system security, and in particular, to generating application profiles that describe system level privileges exercised by an application.

BACKGROUND

Developers of software generally seek to adhere to the "Principle of Least Privilege," which states that a program should run with the least amount of privileges necessary to perform the task at hand, i.e., the task to be accomplished by the program. Exemplary privileges that may be required by a program include file operations (e.g., open, close, read, and write operations), registry operations, and communications operations. Observance of the Principle of Least Privilege by program developers and application installers helps to minimize the amount of damage that can be caused by errors in the program, by possible security breaches, or by attacks that exploit the privileges of the program.

While developers recognize a need to adhere to this principle, it is often difficult to translate this principle into practice. For example, a program typically has some level of unnecessary privilege due to the fact that (1) if a program has too little privilege the program will fail, and (2) a program having too much privilege typically goes unnoticed. Moreover, it is often difficult for a developer to adequately assess the level of privilege required by a program prior to the program's release and deployment. Further, some developers may violate the Principle of Least Privilege by providing more than the least privilege necessary in order to ease implementation and aid debugging and testing. In doing so, developers may avoid time and cost of generating patches and updates to correct for an otherwise insufficient granting of privileges. However, in violating the Principles of Least Privileges, the developers intentionally or inadvertently grant excess privileges that may expose the organization to security risks. Further, during program installation, installers typically do not know what privilege the program needs in order to execute and may install the program with more privilege than it needs.

SUMMARY

In general, the invention is directed toward techniques for real-time, dynamic generation of an application profile that describes an aggregate exercise of privileges by a software program. More specifically, an empirical privilege profiler (EPP) system is described that generates an "application profile" based on empirical information captured during execution of an instance of a software application (i.e., software program) by a plurality of client devices. The profile is empirically generated over a wide range of individual computers, operating systems, file systems, sites, and software versions. Specific privileges exercised by multiple instances of the same program are correlated to create an abstraction of each privilege.

The application profile may be viewed as an empirically formed, abstract composite of information describing the privilege requirements of the deployed instances of the software application. Any single instance of the program may well use less privilege than the composite profile; however, the composite profile specifies a reasonable minimum, and quite possibly less privilege than that granted to the particular instance of the program during default installation. In other words, a profile generated from executions of the program within a single organization will specify the minimum privilege exercised by the program as used by that organization.

After generating the application profile corresponding to the instance of the software application, the EPP system may transmit the composite application profile to the client devices for use in detecting anomalous behavior by each instance of the profiled software application. This may be useful in providing real-time detection of security intrusions and/or monitoring of privilege use by the application instance. Detection of a misuse of privilege beyond the composite profile for the instance of the software application may be reported to an administrator or automatically handled, e.g., by way of terminating the instance. In this manner, the system may, for example, detect attacks on applications by buffer overflow attacks.

Another example use includes using the application profile to set up a program's installation on a client device to control accesses to resources in accordance with the profile. In addition, program developers may utilize the system to better understand a program's use of resources when deployed across various environments in order to adhere to the Principle of Least Privilege.

For example, an EPP system may reside within an enterprise computer network as an EPP server. The EPP server may couple to a plurality of client devices, each including instrumentation that captures empirical information relating to the exercise of privileges by an instance of the particular application being profiled. Typically, this instrumentation is referred to as a software "wrapper." A user may interact with one of the client devices to load and execute an instance of an application using the client device's operating system. During execution of the application instance, the software wrapper captures and logs any function calls to the operating system kernel. The client device may also include an upload module to transmit the log to the EPP server.

Upon receiving the client log, a privilege profiler module included within the EPP server may extract privilege usage information from the log that describes in an abstract manner the exercise of privileges by the application instance. In one embodiment, the privilege profiler conceptually represents each exercised privilege as a sequence of tuples: <ProgramPoint, Resource, {AccessRight}>. That is, each tuple identifes that at a given program point, the particular instance of the software application exercised certain access rights on a certain resource. Each ProgramPoint captures the location in the application that exercises the privilege and the operating system operation that grants the privilege.

After aggregating profile information from various application instances executing on the client devices, the privilege profiler correlates the abstract privilege tuples according to their characterization. The abstract nature of the tuples facilitates correlation across varying client devices that execute instances of the application and that maintain different system resources. Once correlated, the privilege profiler module generates the application profile as a list of these abstract, characterized, and correlated tuples. The EPP server may next transmit the application profile to each of the plurality of client devices, which may utilize the application profile in any of the above described ways. In this manner, through collaboration between the EPP server and client devices, application-specific profiles may be generated using techniques of empirical abstraction, characterization, and correlation.

In one embodiment, a method comprises capturing empirical information relating to the exercise of privileges by a plurality of software application instances executing on top of a plurality of instances of a platform residing within a plurality of client devices. The method further comprises dynamically generating an application profile that describes the aggregate exercise of privileges by the plurality of software application instances based on the empirical information with an empirical privilege profiler (EPP) system.

In another embodiment, a method comprises capturing empirical information relating to the exercise of privileges by a software application instance executing within a client device and logging the empirical information to a log file with a wrapper included within the client device. The method further comprises uploading the log file to an empirical privilege profiler (EPP) system with an upload module included within the client device to facilitate the generation of an application profile that describes the aggregate exercise of privileges by the software application instance.

In another embodiment, a method comprises receiving information relating to the exercise of privileges by a plurality of software application instances executing on top of a plurality of instances of a platform residing within a plurality of client devices via log files uploaded by the plurality of client devices. The method further comprises executing computer-implemented privilege profiling software to dynamically generate an application profile that describes the aggregate exercise of privileges by the plurality of software application instances based the uploaded log files.

In another embodiment, a system comprises a plurality of client computing devices that capture empirical information relating to the exercise of privileges by a plurality of software application instances executing on top of a plurality of instances of a platform residing within the plurality of client computing devices. The system further comprises an empirical privilege profiler system that dynamically generates an application profile that describes the aggregate exercise of privileges by the plurality of software application instances based the empirical information.

In another embodiment, a device comprises a memory to store a log file, and a wrapper that captures empirical information relating to the exercise of privileges by an application instance executing within the device and logs the empirical information to the log file. The device further comprises an upload module that uploads the log file to an empirical privilege profiler (EPP) system to facilitate the generation of an application profile that describes the aggregate exercise of privileges by the application instance.

In another embodiment, a system comprises a memory that stores log files of empirical information relating to the exercise of privileges by a plurality of software application instances executing on top of a plurality of instances of a platform residing within a plurality of client computing devices. The system further comprises a privilege profiler module that dynamically generates an application profile that describes the aggregate exercise of privileges by the plurality of software application instances based empirical information with an empirical privilege profiler (EPP) system.

In another embodiment, a computer-readable medium comprises instructions for causing a programmable processor to capture empirical information relating to the exercise of system-level privileges by a plurality of software application instances executing within a plurality of client computing devices. The computer-readable medium further comprises instructions for causing a programmable processor to dynamically generate an application profile that describes the aggregate exercise of system-level privileges by the plurality of software application instances based on the empirical information with an empirical privilege profiler (EPP) system.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
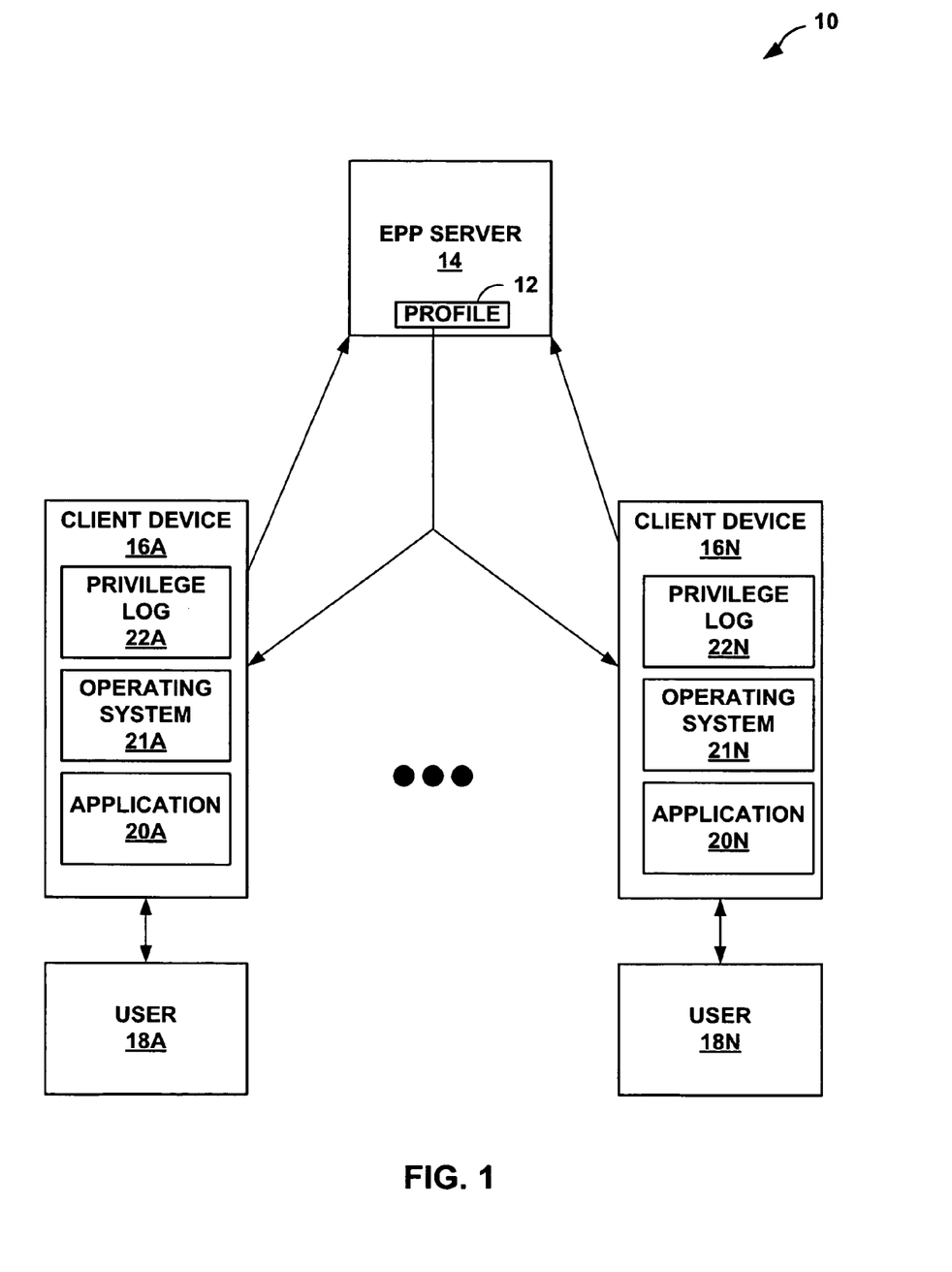
FIG. 1 is a block diagram illustrating an exemplary enterprise computer network that dynamically generates an application privilege profile in accordance with the principles of the invention.

FIG. 1 is a block diagram illustrating an exemplary enterprise computer network 10 that dynamically generates an application privilege profile 12 ("profile 12") in accordance with the principles of the invention. Enterprise computer network 10 includes an empirical privilege profiler server 14 ("EPP server 14") and a plurality of client devices 16A-16N ("client devices 16") coupled to EPP server 14 by one or more networks. Client devices 16 may, for example, include a wide-range of individual computers, file systems, sites, and software versions. Users 18A-18N ("users 18") interact with a respective one of client devices 16 via a keyboard, mouse, touch screen, or other computer input device to cause their respective one of client devices 16 to execute a respective instance of a software program application 20A-20N ("application instances 20").

While described in reference to enterprise computer network 10, the principles of the invention may apply to any computer network, such as a public network or the internet, or any computer system capable of providing profile 12 to client devices 16. Thus, the embodiments or implementations of the techniques described herein are merely an exemplary implementation, and the claims should not be strictly limited this particular embodiment. Also, although not illustrated in FIG. 2, in some embodiments, users 18 may comprise processes, scripts, or the like executing within client devices 16 and controlling application instances 20, and the inventions should not be limited to strictly human users.

EPP server 14 may comprise one or more of application servers or any other type of computing device capable of sending and receiving information to client devices 16 and executing EPP software. Client devices 16 may each comprise one of a personal computer, a laptop, a workstation, a personal-digital assistant (PDA), a wireless device, a network-ready appliance, or other devices. Typically, each of client devices 16 comprises a personal computer executing operating system 21A-21N ("operating systems 21"), such as Windows™ from Microsoft Corporation, Linux, Unix, Mac OS from Apple Computer, or any other operating system that provides a suitable environment for executing respective applications instances 20. Each of operating systems 21 comprises an instance of a single platform, or operating system, such as one of the above described operating systems. For example, operating system 21A may be one instance of the Unix operating system, and operating system 21N may be another instance of the same Unix operating system. Applications instances 20 each represent a separate instance of the same enterprise software program, such as Microsoft Outlook, Notepad, Microsoft Word, Windows Calculator, or netsh (a Windows command line network configuration application).

Initially, users 18 may log into their respective client devices 16 by entering a username and password. After logging in, each of users 18 may cause client devices 16 to execute respective application instances 20 via interactions with one of the above described computer input devices. Next, client devices 16 launch and execute application instances 20. During execution of respective application instances 20, client devices 16 log kernel calls issued to the operating systems 21 by respective application instances 20.

When logging the kernel calls, the client devices record the exercise of any resources by the application instances 20 to respective privilege log files 22A-22N ("privilege log files 22"). Upon either termination of its respective application 20, in response to an event, or at some set interval of time, client devices 16 upload their respective privilege log files 22 to EPP server 14. In other embodiments, each of client devices 16 may upload its privilege log file 22 immediately to EPP server 14 upon making a change to the respective privilege log file 22, whereupon EPP server 14 updates aggregation privilege information for the client devices 16.

Once uploaded, EPP server 14 processes each of privilege log files 22 to dynamically generate an empirical privilege profile, i.e., profile 12, that describes the aggregate exercise of system-level privileges by application instances 20. In some embodiments, EPP server 15 may process privilege log files 22 in real-time.

In one example embodiment, profile 12 comprises an application-specific list of tuples that describe the system resources necessary to execute respective application instances 20. In one embodiment, the EPP server 14 conceptually represents each exercised privilege as a sequence of one or more tuples: {<ProgramPoint, Resource, {AccessRight}>}. That is, each tuple identifies that at a given program point, the particular instance of the software application exercised certain access rights on a certain resource.

EPP server 14 may characterize each tuple of the list of tuples within application profile 12 into three distinct categories of privileges: constant, variable, and not-yet-categorized privileges. Constant privileges include hard coded privileges, or privileges specified in the source code of application instances 20, that application instances 20 must receive in order to execute within client devices 16. An example constant privilege may include a privilege to read an initialization file found at a constant memory address within client device 16. A variable privilege includes user-specified privileges, such as privileges to open and edit a file dynamically created by one of users 18. A not-yet-categorized privilege is a privilege that EPP server 14 was unable to characterize due to a lack of empirical data or, in other words, a lack of sufficient log file information. Once finished generating profile 12, EPP server 14 transmits profile 12 to each of client devices 16, e.g., via an intermediate network.

Upon receiving profile 12, users 18 of client devices 16 may utilize profile 12 to determine or set system security, privilege management policies, and/or adherence to the Principle of Least Privilege. Profile 12 may facilitate detection of system security concerns by enabling a system administrator to determine whether an instance of application 20 requires users 18 to possess excessive privileges. Moreover, profile 12 may facilitate the development of privilege management policies by enabling the system administrator to minimize privileges granted to user in order to execute application instances 20. As another example, developers may utilize profile 12 to determine whether an application in development adheres to the Principle of Least Privilege. Thus, enterprise computer system 10 facilitates adherence to the Principle of Least Privilege, thereby possibly providing more stable and secure computer networks through better privilege management.

Figure 2A:
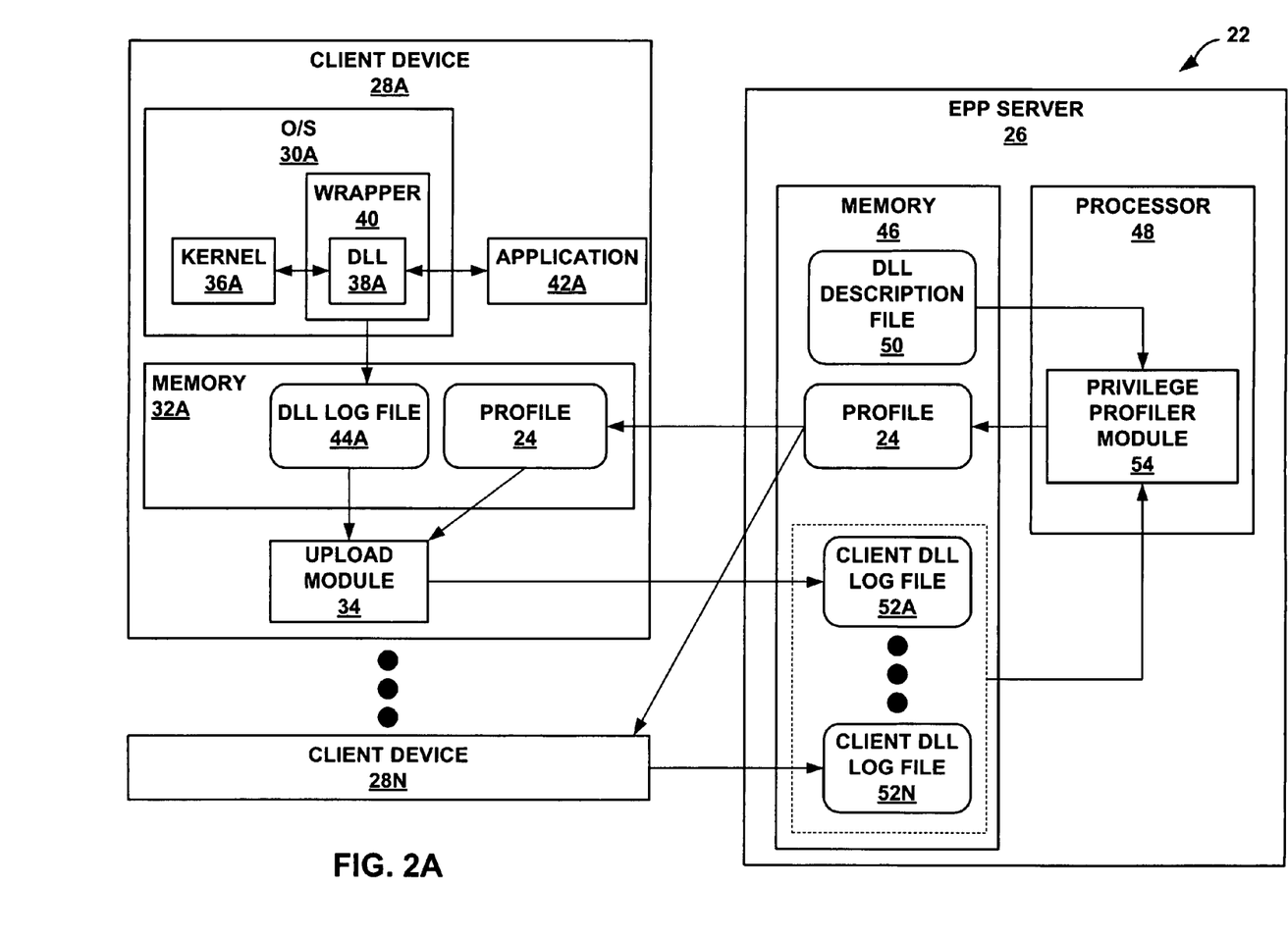
FIG. 2A is a block diagram illustrating in more detail another exemplary enterprise computer system that dynamically generates an application-specific privilege profile according to the principles of the invention.

FIG. 2A is a block diagram illustrating in more detail another exemplary enterprise computer system 23 that dynamically generates an application-specific privilege profile 24 ("profile 24") according to the principles of the invention. Enterprise computer system 23 may be substantially similar to enterprise computer system 10 of FIG. 1 in that enterprise computer system 23 also includes an EPP server 26 and client devices 28A-28N ("client devices 28"). Although client devices 28B-28N are not fully illustrated, they may be substantially similar to client device 28A and may include substantially similar components to those described below in reference to client device 28A.

As shown in FIG. 2A, client device 28A includes an operating system 30A ("O/S 30A"), a memory 32A, and an upload module 34. O/S 30A may comprise one of the Windows operating systems, such as Windows XP or Windows NT, a Unix operating system, a Linux operating system, a Mac operating system by Apply Computers, or any other operating system that includes a kernel requiring system-level privileges. Memory 32A may comprise one or more of static memory, such as a hard drive, flash memory, and/or electrically erasable programmable read-only memory (EEPROM), and dynamic memory, such as random access memory (RAM), dynamic random access memory (DRAM), and/or a cache. Upload module 34 may comprise hardware, software, or both to enable client device 28A to upload files to EPP server 26.

O/S 30A includes a kernel 36A and a kernel interface module 38A encased by a software wrapper 40 ("wrapper 40"). In some embodiments, wrapper 40 encases more than just one kernel interface module 38A and may encase all kernel interface modules (not shown in FIG. 2A) to which an instance of an application 42A ("application instance 42A") make calls. Application instance 42A may invoke functions included within kernel interface module 38A in order to interface with kernel 36A of O/S 30A. Kernel 36A represents one or more core modules of O/S 30A responsible for memory, process execution, and I/O interface management. Kernel interface module 38A represents a system-level software module providing an API that software applications, such as application instance 42A, may call in order to interface with kernel 36A and thereby access system resources known to and controlled by O/S 30A. Wrapper 40 comprises a layer of software introduced into client device 28A so as to capture calls to kernel 36 by way of kernel interface module 38A.

As one example, O/S 30A may be a Windows operating system, kernel 36A may be the Windows operating system kernel, and kernel interface module 38A may be a Windows digital link library, such as ntdll.dll. Application instance 42A may comprise one of many types of software discussed above in reference to application instances 20 of FIG. 1. This configuration is described below as one example so as to illustrate the principles of the invention. As another example, O/S 30A may be a UNIX operating system, kernel 36A may be the UNIX operating system kernel, and kernel interface module 38A may be a system call interface. Thus, the principles of the invention should not be limited to strictly DLLs, system call interface, or any other particular type of kernel interface module but may include other operating system kernel reference structures or simply the kernel itself. In other embodiments, the principles of the invention may be applied such that profiles are generated with respect to a platform, such as the Java Virtual Machine platform, as described herein.

Memory 32A represents data memory or possibly persistent storage used to store log file 44A and profile 24. Wrapper 40 generates log file 44A and, in one embodiment, writes the log in accordance with the extensible markup language (XML). Log file 44A represents a privilege log, and includes information describing each kernel call to kernel interface module 38A by application instance 42A. Thus, log file 44A comprises an application-specific and client-specific log of calls to kernel interface module 38A.

An exemplary log file 44A may comprise expressions in the following notional grammar:

PrivilegeUses ::={PrivilegeRequirement}+
PrivilegeUse ::=<Resource>: {ConditionalAccessRightSet}
ConditionalAccessRightSet ::=<Condition>→{<AccessRight>}

That is, application instance 42A's use of privilege is denoted in a sequence (i.e., in braces) of one or more instances of that privilege use. Each instance of privilege use describes the use of a single resource.

Profile 24, as described above, is received from EPP server 26, and describes aggregate access to resources of client devices 28 by application instances 42. While only shown to contain a single log file 44A and a single profile 24, multiple DLLs may be wrapped, and memory 32A may store multiple application profiles similar to profile 24. Each additional application profile (not shown) corresponds to a different application. As one example, computer device 28A may execute and profile multiple applications similar to application instance 42A, and wrapper 40 may generate distinct log files for each application that accesses kernel interface module 38A.

EPP server 26 is shown in simplified form as having a memory 46, or other storage medium, and a processor 48. Memory 46 stores a privilege description file 50, profile 24, and copies of client log files 52A-52N ("client log files 52"). In some embodiments, client log files 52 comprise an exact copy of respective log files 44A-44N (only log file 44A shown in FIG. 2). In other embodiments, client log files 52 comprise a subset of the descriptions logged in log files 44A-44N. In either embodiment, EPP server 26 may store client log files, similar to client log files 52, for other applications, and although these additional log files are not shown in FIG. 2A, the principles of the invention should not be limited as such.

Processor 48 is a CPU that provides an execution environment for executing a privilege profiler software module 54 that accepts as input privilege description file 50 and client log files 52, and generates profile 24 based on these inputs Referring again to FIG. 2A, initially, a network administrator configures enterprise computer system 23 to enable client devices 28A to log calls to kernel interface module 38A. Specifically, the network administrator may install and configure wrapper 40 and upload module 34, such that wrapper 40 generates log file 44A, and upload module 34 uploads log file 44A to EPP server 26. The network administrator also configures EPP server 26 by loading privilege description file 50 and privilege profile module 54.

Once configured, users, such as users 18 of FIG. 1, may log into client devices 28. For example, user 18A may log into client device 28A by entering a username and password at a sign-in screen provided by O/S 30A. Once logged in, O/S 30A may assign user-specific privileges to user 18A, thereby limiting user 18A's access to certain resources. Through interactions with client device 28A, user 18A may direct O/S 30A to launch and execute application instance 42A.

In executing application instance 42A, O/S 30A may grant certain system-level privileges to application instance 42A that may be utilized by application instance 42A. For example, application instance 42A may comprise a word processor program, and O/S 30A may allocate file manipulation privileges, such as file open, file read, file write, and file delete privileges, to application instance 42A. User 18A may interact with application instance 42A to open a file, thereby requiring application instance 42A to invoke a file open function defined within kernel interface module 38A. The file open function may require that application instance 42A exercise the file open privilege, and wrapper 40 logs the corresponding function call(s) to log file 44A. Wrapper 40 may log one or more of the functions being invoked and its arguments, including the contents of any file handles or other nested structures, a return status, i.e., whether the function call succeeded, values of any passed-by-reference structures after the call completes, any access tokens, the program counter of the caller, and the program counter of the last call from application instance 42A to kernel interface module 38A.

During execution of application instance 42A, wrapper 40 may continue to log all function calls to kernel interface module 38A or may only log those that require privileges to log file 44A. Upon user 18A terminating execution of application instance 42A, wrapper 40 may close log file 44A and stop logging function calls to kernel interface module 38A. Upon either the closing of log file 44A or according to some pre-defined upload schedule configured by the network administrator, upload module 34 may upload log file 44A to EPP server 26. In some embodiments, upload module 34 may first compare profile 24, if it exists, to log file 44A to determine if application instance 42A invoked any new system-level privileges or privileges previously characterized as not-yet-categorized within profile 24. In instances where new or not-yet-categorized privileges were invoked, upload module 34 may upload only these new or not-yet-categorized privileges to EPS server 26. In other embodiments, upload module 34 may make no comparison to profile 24 and instead load the entire log file 44A to EPP server 26. In either embodiment, upload module 34 may load a portion of or the entire log file 44A to EPP server 26, as represented by client log file 52A.

Figure 2B:
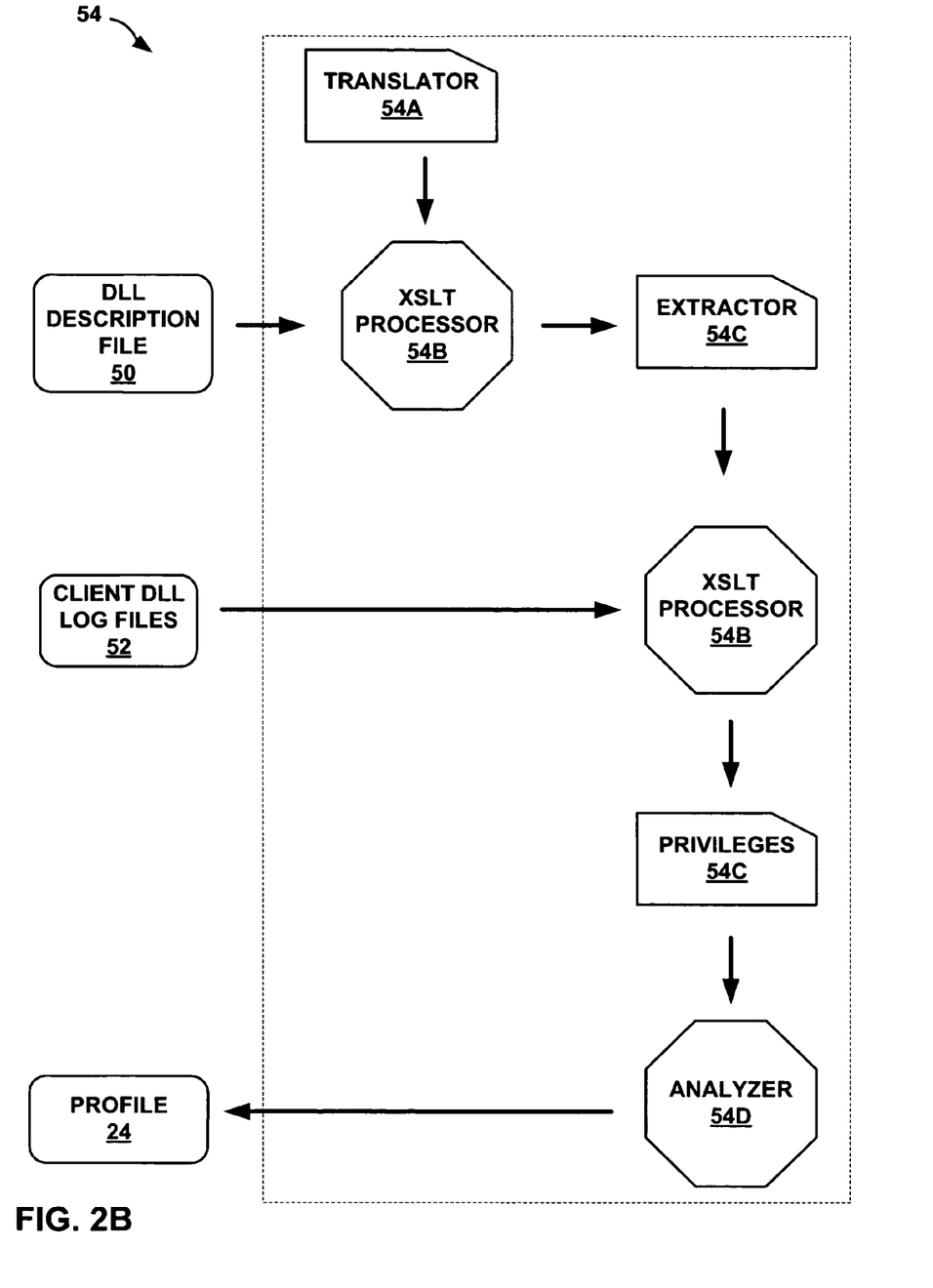
FIG. 2B is a block diagram illustrating an exemplary embodiment of the conceptual framework that applies knowledge about OS privileges in a privilege description file to the client log files.

Once EPP server 26 receives a sufficient number of client log files 52 from client devices 28, privilege profiler module 54 may process client log files 52. In other embodiments, privilege profiler module 54 may process client log files 52 in real-time whenever one of client devices 28 uploads one of client log files 52. As shown in FIG. 2B, in one embodiment privilege profiler module 54 includes extensible style language transformation (XSLT) processor 54B for processing programming scripts writing in accordance with the XSLT programming language. In a first stage, XSLT processor 54B executes a translator XSLT script 54A to translate privilege description file 50 into the second XSLT script, extraction rules 54C. That is, translator 54A processes privilege description file 50 into a set of rules for extracting privilege information from recorded kernel calls.

Privilege description file 50 comprises a description of the privileges required to execute operations defined within kernel 36A. For example, a privilege exercised by an application instance on a particular resource can be expressed as a set of conditional access rights (see "ConditionalAccessRight-Set"). A set of conditional access rights is a set of access rights subject to a condition. In the illustrated embodiment, because kernel interface module 38A provides an interface to kernel 36A, privilege description file 50 comprises a description of the privileges required to execute operations defined by kernel interface module 38A that reference kernel 36A. In other embodiments where operating system 30A comprises a Unix operating system, for example, privilege description file 50 describes application calls to the Unix kernel directly. In yet other embodiments, the principles of the invention may be applied to platforms, such as the Java Virtual Machine platform, wherein privilege description file 50 describes calls to the Java Virtual Machine. Typically, privilege description file 50 encodes the description in accordance with XML specifications.

Privilege profiler module 54 subsequently uses extraction rules 54C as an input to XSLT processor 54B, which in turn, utilizes extraction rules 54C as a rule-basis for extracting abstract tuples from client log files 52, thereby producing privilege files 54D that abstractly characterize the tuples recorded in respective client log files 52. These tuples are "abstract" in that they do not relate to any one computer, user, or site. Privilege profiler module 54 applies extraction rules 54C to client log files 52 to generate privilege tuples in the following format:

{<ProgramPoint, Resource, {AccessRight}>}, where braces denote sets of items.

In determining the tuples, extraction rules 54C of privilege profiler module 54 determine the tuples by first extracting the program point at which a call to kernel interface module 38A occurred from client log files 52. Second, extraction rules 54C determine the tuples by extracting the resource accessed by the function call from client log files 52. Third, extraction rules 54C extract the access rights required to exercise a successful function call from client log files 52. Again, because each of client log files 52 originates from different client devices 28, that may maintain varying resources, XSLT processor 54B generates an abstract, or resource-independent, tuple according to the rules defined in extraction rules 54C such that analyzer 54E can correlate the determined tuples regardless of which one of client devices 28 generated client log file 52 from which the tuple originated.

In order to provide abstract tuples, XSLT processor 54B applies extraction rules 54C to determine the program point such that it is independent of the client device. For example, extraction rules 54C may cause XSLT processor 54B to determine the program point by combining the program counter at which the request originates with the point in kernel interface module 38A that accesses the resource. Thus, an abstracted, platform-independent program point may be defined by the following program point tuple:

<ProgramCounter, Operation>, where ProgramCounter represents the program counter at which application instance 42A relinquished control to a kernel interface module, either immediately to kernel interface module 38A or to an intermediate kernel interface module (not shown in FIG. 2A). Alternatively, in some embodiments, XSLT processor 54B applies extraction rules 54C not to determine a program counter, but to determine an offset from the beginning of the program file. In other embodiments, XSLT processor 54B applies extraction rules 54C to determine a hash of code adjacent to that which invoked the operation. These embodiments may be preferred in instances where the application instance has been relocated in a memory, such that the program counters would be meaningless, while the offset or hash would enable the described functionality. The Operation represents the name of the function defined by kernel interface module 38A that application instance 42A ultimately invoked.

After forming abstract tuples by defining platform-independent program points, XSLT processor 54B writes the tuples to privilege files 54D, where each of privilege files 54D correspond to one of client log files 52. Analyzer 54E characterizes and correlates the tuples stored within respective privilege files 54D. Analyzer 54E may use other information obtained from the binary program file(s) to obtain information about specific resources, such as files, registry keys, or ports, but for ease of illustration purposes, only constant strings are discussed herein. Typically, in generating analyzer 54E, EPP server 26 or a human being may scan the binary code of application instance 42A in search of these constant strings and configure analyzer 54E such that it stores these constant strings. Thus, privilege profiler module 54 may quickly characterize as constant any resource defined by the constant string.

To determine variable privileges, analyzer 54E of privilege profiler module 54 may initially characterize all resources accessed by non-constant strings as not-yet-categorized. However, upon determining that multiple tuples include the same program points and access rights, analyzer 54E may correlate them into a single tuple characterizing a single abstract resource. Analyzer 54E may also reference profile 24 in order to possibly characterize those tuples stored to profile 24 and characterized as not-yet-categorized. During characterization, analyzer 54D may further discard redundant tuples found in privilege files 54D.

Once characterized, analyzer 54E writes these characterized tuples to profile 24. Once privilege profile module 54 finishes writing tuples to profile 24, EPP server 26 transmits a copy of profile 24 to each of client devices 28, as represented by profile 24 stored in memory 32A.

In this way, enterprise computer network 22 may distribute profile 24 to client devices 28. Client devices 28 may utilize profile 24 in a number of ways. For example, client device 28 may incorporate additional hardware and/or software (not shown in FIG. 2) to enforce profile 24, thereby preventing an attacker from altering application instance 42A so as to gain additional privileges that may pose a security risk. As another example, client device 28A may include developer tools that allow user 18A to determine whether an application under development, e.g., application instance 42A, adheres to the principle of least privilege.

Figure 3:
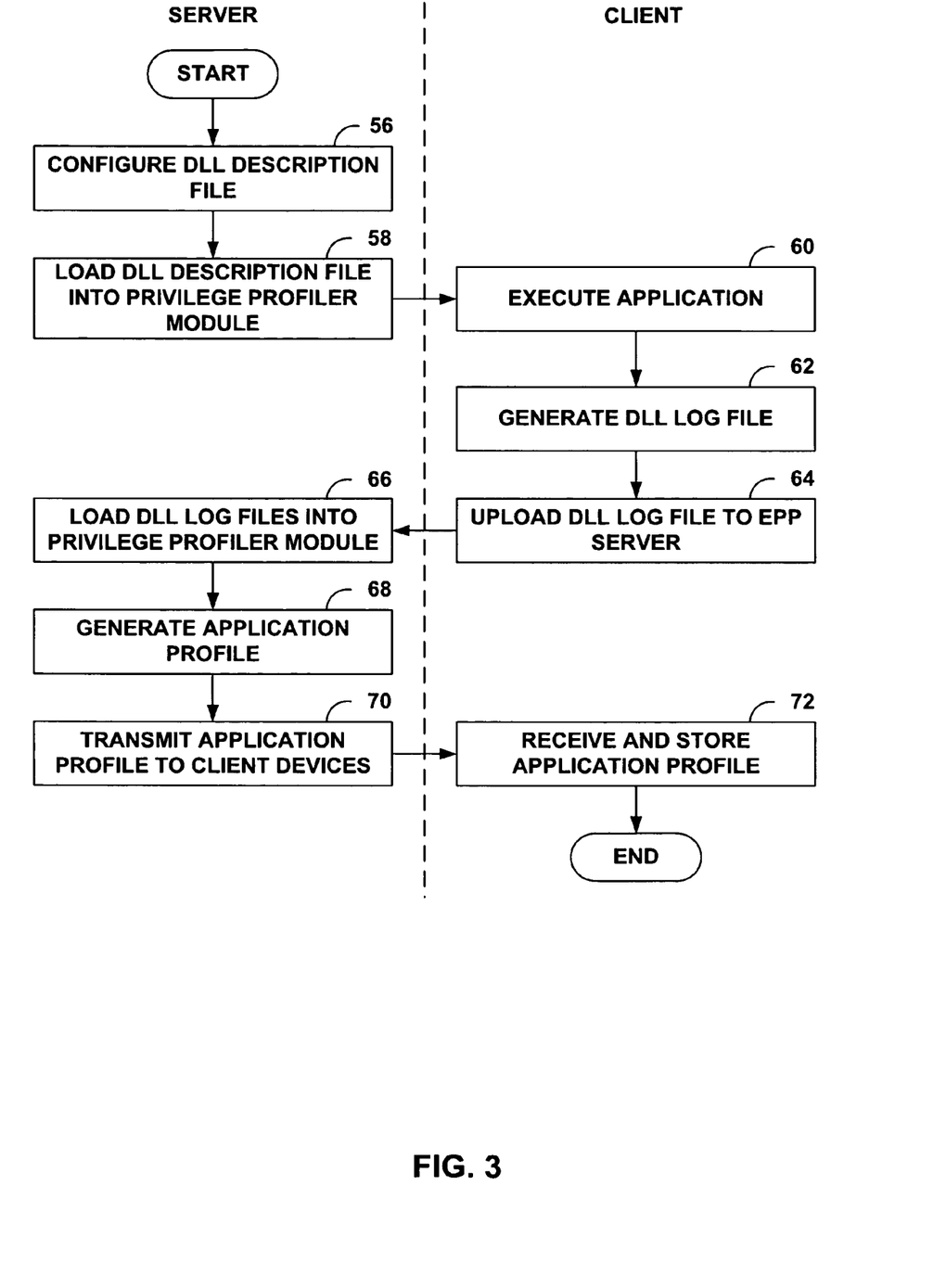
FIG. 3 is a flowchart illustrating exemplary operation of an enterprise computer network in which an EPP server dynamically generates an application-specific, system-level privilege profile in accordance with the principles of the invention.

FIG. 3 is a flowchart illustrating exemplary operation of an enterprise computer network, such as enterprise computer network 22 of FIG. 2, in which an EPP server dynamically generates an application-specific, system-level privilege profile, such as profile 24, in accordance with the principles of the invention. For purposes of illustration, the flowchart of FIG. 3 will be described in reference to FIG. 2, although the method may be implemented on different devices and within a different context, e.g., a public network instead of a private enterprise network, from that illustrated in FIG. 2.

Initially, the network administrator may load privilege description file 50 into privilege profiler module 54 of EPP server 26 (58), thereby causing processor 48 to generate extraction rules 54C within privilege profiler module 54. After generating extraction rules 54C, privilege profiler module 54 may wait a specified amount of time or until a collection of client log files 52 exists before generating a new profile 24.

On the client-side, the network administrator may also configure client devices 28 to log calls to kernel interface module 38A by installing wrapper 40 and upload module 34, as described above. Once the network administrator configures client device 28A, a user, such as user 18A of FIG. 1, may log into O/S 30A of client device 28A and interact with O/S 30A to cause it to load and execute application instance 42A (60). During interactions between application instance 42A and user 18A, application instance 42A may call functions specified in kernel interface module 38A, which in turn, triggers wrapper 40. Wrapper 40 analyses the call and gathers the information described above. Wrapper 40 logs the above described information relating to the call, thereby generating log file 44A (62). In some embodiments, wrapper 40 does not log the call unless the call requires O/S 30A to exercise a privilege.

Once generated, upload module 34 may upload the log file to EPP server 26, as represented by client log file 52A (64). Upload module 34 may only upload deviations from profile 24, if memory 32A stores profile 24, as described above. Once uploaded, privilege profiler module 54 may determine that sufficient client log files 52 exist to warrant generating a new profile 24. Alternatively, privilege profiler module 54 may routinely generate a new profile 24 according to a schedule set by the network administrator. Regardless of the triggering event, XSLT processor 54B loads and processes client log files 52 according to extraction rules 54C to determine the abstract tuples described above and store these abstract tuples to respective privilege files 54D (66). Analyzer 54E characterizes these abstract tuples stored to privilege files 54D and correlates the now characterized abstract tuples to generate profile 24, as described above (68).

Once it finishes generating profile 24, EPP server 26 may transmit the newly generated profile 24 to each of client devices 28 replacing the old profile 24 stored within memory 32A (70). Each of client devices 28 receive and store the newly generated profile 24 for use in monitoring security and/or development concerns, as described above (72). In this manner, through collaboration between EPP server 26 and client devices 28, application-specific privilege profiles, such as profile 24, may be generated using techniques of empirical abstraction, characterization, and correlation.

Figure 4:
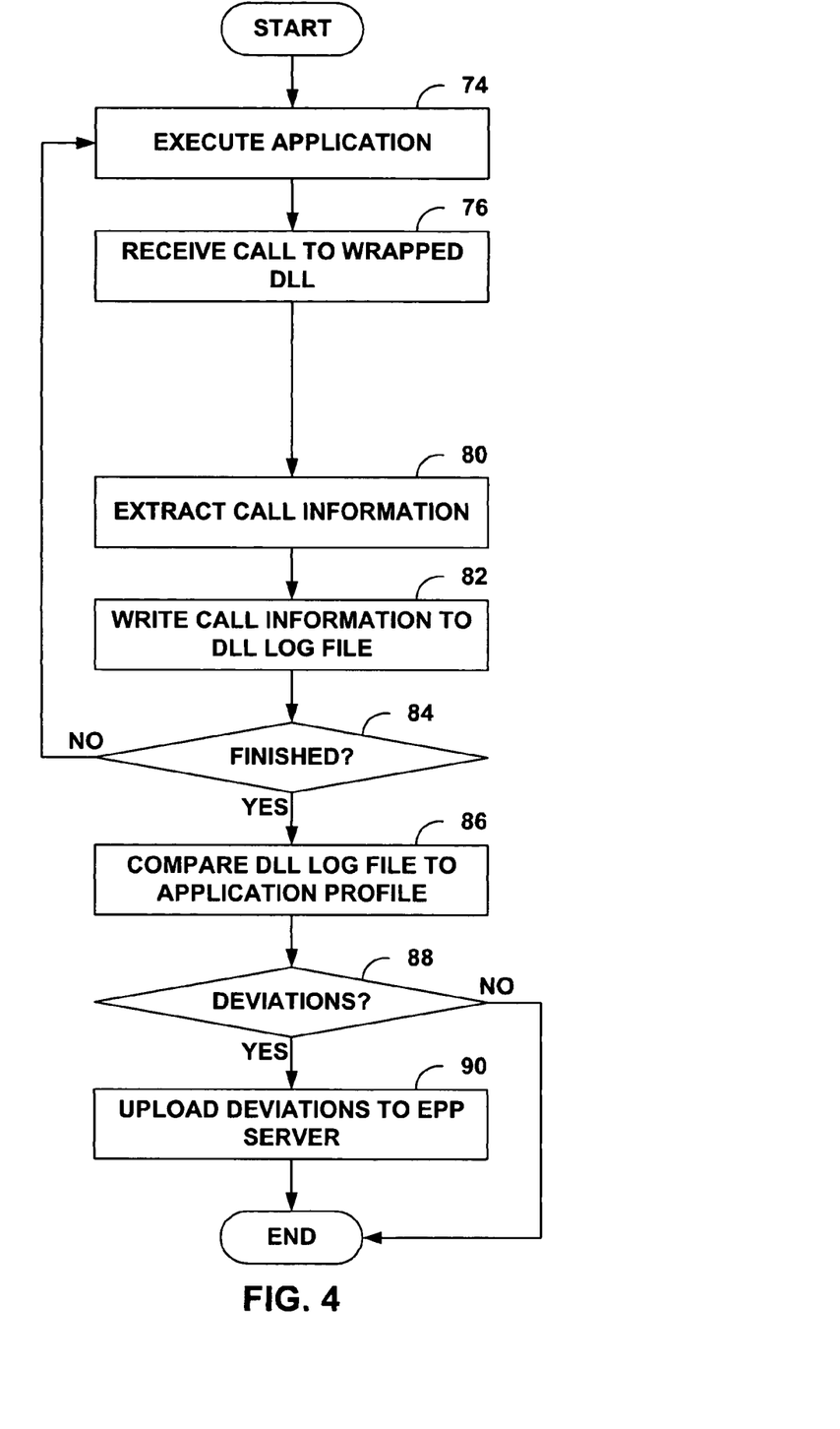
FIG. 4 is a flowchart illustrating exemplary operation of a client device in capturing and logging information for use in generating an application-specific, system-level privilege profile.

FIG. 4 is a flowchart illustrating exemplary operation of a client device, such as client device 28A of FIG. 2, in capturing and logging information for use in generating an application-specific, system-level privilege profile, such as profile 24. For purposes of illustration, the flowchart of FIG. 4 will be described in reference to FIG. 2A, although the method may be implemented on different devices and within a different context, e.g., a public network instead of a private enterprise network, from that illustrated in FIG. 2.

To begin capturing information relating to calls to functions of kernel interface module 38A, a network administrator typically installs both wrapper 40 and upload module 34, as described above. Moreover, in a typical enterprise computer network, a user, such as user 18A of FIG. 1, logs into O/S 38A prior to interacting with O/S 38A. Once logged in, user 18A may interact with O/S 38A and cause it to load and execute application instance 42A (74).

While executing, application instance 42A may call functions specified within kernel interface module 38A, which resides within wrapper 40 (76). For example, user 18A may interact with application instance 42A to open a user-specified file with a path and filename of "C:\files\foo\bar.doc." Application instance 42A may invoke a file_open function specified by kernel interface module 38A and pass in the "C:\files\foo\bar.doc" string as a parameter to the function. The function may require that application instance 42A have certain privileges to access the specified file, and application instance 42A either has those privileges or the function fails. Wrapper 40 intercepts this open_file function call, extracts the call information described above, and writes this information to log file 44A (80, 82). In some embodiments, wrapper 40 may first determine whether the function call requires a privilege, and only log those that require a privilege. Once logged, wrapper 40 continues to log kernel interface module 38A function calls until user 18A exits application 42 ("NO" 84, 74-84).

In the event user 18A terminates execution of application instance 42A ("YES" 84), upload module 34 may compare log file 44A to profile 24 (86). If update module 34 determines there are new or previously not-yet-categorized privileges, i.e., deviations, between log file 44A and profile 24 ("YES" 88), upload module 34 uploads these deviation logs of log file 44A to EPP server 26. However, if there are no deviations ("NO" 88), upload module 34 does not upload any portion of log file 44A to EPP server 26. In this manner, client device 28A may capture and log information relating to privileged function calls using wrapper 40 and upload module 34.

Figure 5:
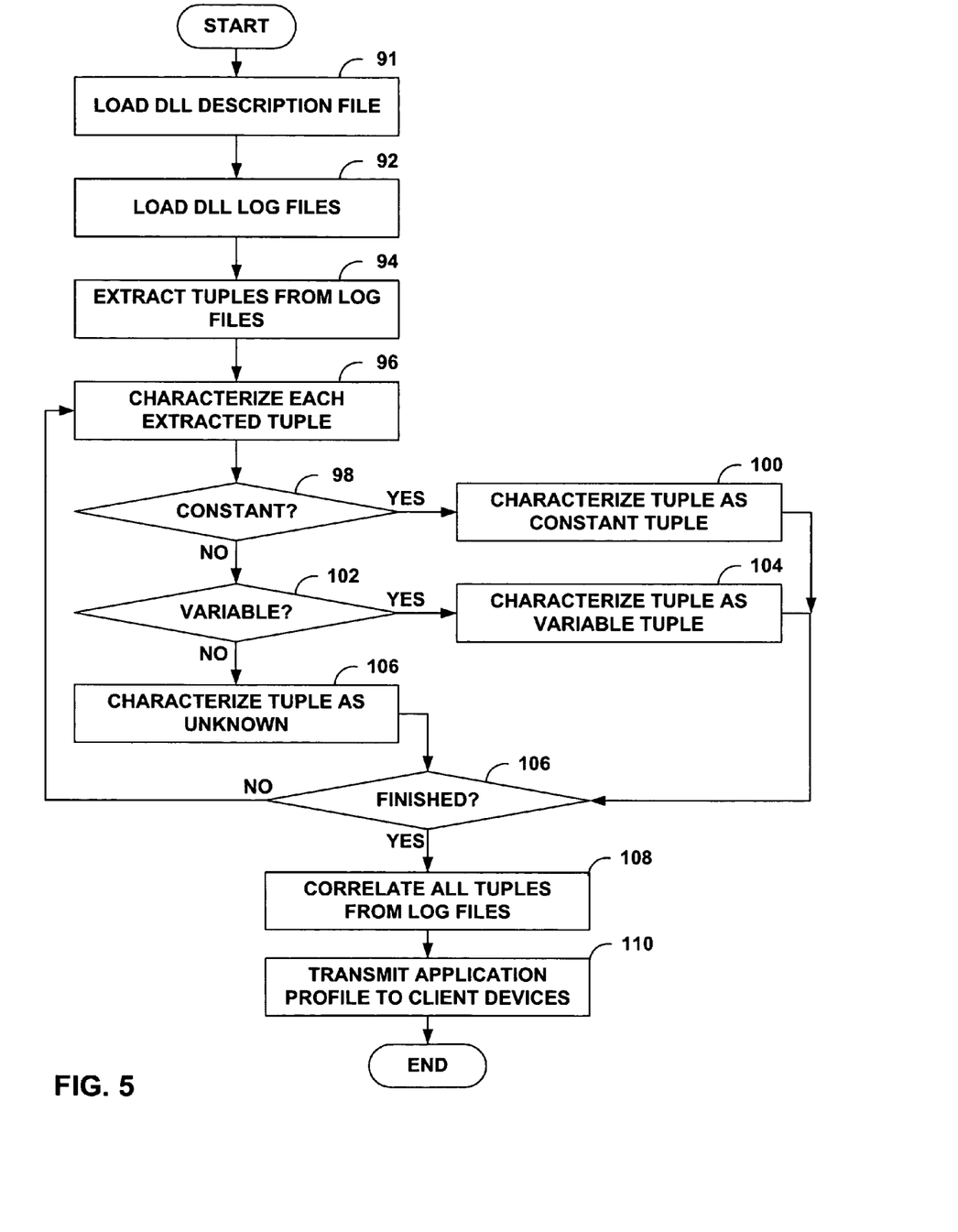
FIG. 5 is a flowchart illustrating exemplary operation of an EPP system in generating an application profile based on empirical abstraction, characterization, and correlation of tuples extracted from client log files.

FIG. 5 is a flowchart illustrating exemplary operation of an EPP system, such as EPP server 26 of FIG. 2, in generating an application profile, such as profile 24, based on empirical abstraction, characterization, and correlation of tuples extracted from client log files, such as client log files 52. For purposes of illustration, the flowchart of FIG. 5 will be described in reference to FIGS. 2A, 2B, although the method may be implemented on different devices and within a different context, e.g., a public network instead of a private enterprise network, from that illustrated in FIG. 2.

Initially, a network administrator may load privilege description file 50 into privilege profiler module 54, as described above (91). As further described above, XSLT processor 54B invokes translator 54A to translate privilege description file 50 into a set of extraction rules embodied within extraction rules 54C. Upon one of the above described triggering events, privilege profiler module 54 loads client log files 52, whereupon the XSLT processor 54B applies extraction rules 54C, as described above, and analyzer 54D begins the generation of profile 24 (92).

XSLT processor 54B begins by first extracting all information necessary to form tuples from client log files 52 and building the abstract tuples from this information, both according to the rules defined within extraction rules 54C (94). Once extracted, XSLT processor 54B stores the abstract tuples to privilege files 54D. Analyzer 54E reads privilege files 54D to characterize each of the extracted tuples (96). Analyzer 54E characterizes the tuples by determining whether each extracted tuple contains information matching one of the defined constant strings (98). As described above, analyzer 54E may rely on other criteria, such as a file operation and the directory in which the file is located, in determining constant tuples and the invention should not be limited as such; however, for ease of illustration purposes, only constant strings are described herein.

If a match occurs ("CONSTANT" 98), analyzer 54E characterizes the tuple as a constant tuple (100). If no match occurs and it determines that the tuple matches one of the previously not-yet-categorized tuples of profile 24, or in some embodiments, if a match counter reaches a certain threshold ("VARIABLE" 98), analyzer 54E characterizes the tuple as a variable tuple (102). If no match to a not-yet-categorized tuple occurs in the variable comparison or if no not-yet-categorized tuples exist with which to compare the extracted tuple against ("NOT-YET-CATEGORIZED" 98), analyzer 54E characterizes the tuple as a not-yet-categorized tuple (104). Analyzer 54E continues to characterize the extracted tuples until it characterizes all of the extracted tuples, i.e., finishes ("NO" 106, 96-106). Throughout characterization, analyzer 54E may correlate tuples in order to characterize them, as described above in reference to characterizing variable tuples.

Once analyzer 54E finishes characterizing all of the extracted tuples ("YES" 106), it updates profile 24 with the characterized tuples by inserting new privileges, updating the characterization of not-yet-categorized tuples, or performing both. Privilege profile module 54 transmits updated profile 24 to client devices 28 (110). In this manner, an EPP system, such as EPP server 26, may generate profile 24 by extracting tuples from client log files 52 provided by client devices 28, characterizing those tuples, and correlating those characterized tuples.

While described above in reference to a computer network, and more specifically, an enterprise computer network, the principles of the invention may include other configurations involving public networks, such as the internet, as well as, non-networked configurations. An exemplary public network configuration may include an EPP server similar to EPP server 26 and a multitude of client devices similar to client devices 28. Client devices 28 may register with EPP server 26, whereby the registration process EPP server 26 installs the required wrapper 40 and upload module 34. Client device 28A, for example, may then upload log file 44A to EPP server 26 via the public network. EPP server 26 may process log file 44A, as described above, to generate profile 24.

An exemplary non-networked configuration may include a single computer system, wherein both the EPP system and application reside within the single computer system. In this instance, the wrapper captures function calls to the kernel reference module and logs these calls. The upload module may still perform deviation checks and upload only those deviations to a section of memory reserved for the EPP system. Once uploaded, the privilege profiler module of the EPP system may load the client log file, generate an application profile based on this client log file, and store the application profile to a portion of memory reserved for the application profile. Thus, even though described above in reference to networked configurations, the principles of the invention should not be limited as such.

Finally, the operations described above in reference to the EPP server and the client computing devices typically occur simultaneously and independently. In other words, the client computing device may log calls to its kernel prior to configuring the EPP server to generate application profiles, or the EPP server may be configured to generate application profiles even though the client computing devices currently does not log calls to its kernel. Thus, although the above description may appear to indicate contingent operation by both the EPP server and the client computing devices, the principles of the invention should not be construed to require such contingent operation. Various embodiments of the invention have been described. These and other embodiments are within the scope of the claims listed below.

EXAMPLE

An exemplary prototype of the techniques described herein was developed that allowed client devices executing the Windows XP operating system to record function calls to the Windows XP kernel via the "ntdll.dll" kernel reference module. The wrapper encased the ntdll.dll Windows XP kernel reference module, or simply ntdll.dll, and enabled logging of function calls to the ntdll.dll according to conventional wrapper techniques. Applications including Microsoft Word, Microsoft Outlook, the Windows XP calculator application, and the Windows XP netsh application typically make function calls to ntdll.dll that require the exercise of system-level privileges.

As described above in reference to FIG. 2A, users interacted with the client device to load and execute an application, such as application instance 42A, within the Windows XP O/S, such as O/S 30A. The application instance called functions specified in ntdll.dll, or kernel interface module 38A, whereupon the wrapper intercepted the function call. The wrapper logged the empirical information relating to the exercise of privileges necessary for a successful function call. A wrapper around the application was used to determine the program point that ultimately originated the call to the Windows XP kernel. Once the user terminated the application instance, the wrapper stopped logging the function calls to ntdll.dll, and an upload module, such as upload module 34, uploaded the log to an EPP server, such as EPP server 26, where a composite profile was generated for the plurality of client devices.

Assuming in this example that the software application instance comprised an instance of the Microsoft Notepad application, EPP server 26 may generate the following profile after eight client log files corresponding to eight execution of Notepad instances have been uploaded to EPP server 26 (Note: only file resources are mentioned in this partial profile, but EPP can characterize resources of all kinds, including files, directories, registry keys, and communications ports):

30 Constant Resources
    notepad.exe, DLLs, pipes

5 Variable Resources (Each Represents at Least 5 Actual Files, Often Many More)
    Files read by notepad
    New file created by notepad
    Directories traversed to get to an edited file
    Files located in directories traversed by Notepad
    Shadow file 24 Not-Yet-Categorized Resources (out of 633 in all 8 Executions)
    24 files were not categorized In the above exemplary profile, EPP server 24 generated a profile containing 30 constant tuples describing use of 30 constant resources, 6 variable tuples describing use of 6 variable resources, and 24 not-yet-categorized tuples describing use of 24 not-yet-categorized resources. The 30 constant tuples describe how Notepad uses notepad.exe, various DLLs, and various pipes, all of which are named files or pipes that it expects to be present. The 6 variable tuples group files used by notepad.exe into categories. Each of these variable tuples describes Notepad's use of at least 5 actual files, and often many more. The 24 not-yet-categorized tuples describe Notepad's use of 24 files which have not yet reached the threshold use amount. In this example, EPP server 24 required that 5 resources accessed during the 8 execution of notepad.exe have a matching characterization in order for it to be characterized. Therefore, these 24 not-yet-categorized tuples match fewer than 4 other resources accessed during the 8 executions of notepad.exe.

The invention claimed is:

1. A method comprising:
    capturing empirical information relating to the exercise of privileges by a plurality of software application instances executing on top of a plurality of instances of a platform; and
    dynamically generating an application profile that describes the aggregate exercise of privileges by the plurality of software application instances based on the empirical information.

2. The method of claim 1,
    wherein capturing the empirical information includes capturing empirical information relating to the exercise of system-level privileges by the plurality of software application instances executing on top of the plurality of instances of the platform, and
    wherein dynamically generating the application profile comprises dynamically generating in real-time the application profile that describes the aggregate exercise of system-level privileges by the plurality of software application instances based on the empirical information.

3. The method of claim 1, wherein capturing the empirical information includes capturing one or more of contents of any file handles or other nested structures, a return status, and argument values from an invocation of a kernel reference module and a program counter of the calling one of the plurality of software application instances.

4. The method of claim 1, further comprising:
    logging the empirical information to a plurality of log files with a wrapper; and
    uploading the plurality of log files to an empirical privilege profiler (EPP) system with an upload module.

5. The method of claim 4, wherein dynamically generating an application profile includes dynamically generating an application profile based on the uploaded plurality of log files with the EPP system.

6. The method of claim 4, wherein uploading the plurality of log files includes:
    determining whether the plurality of log files includes empirical information describing privileges that deviate from the corresponding application profile with the upload module; and
    uploading only a portion of the empirical information that describes privileges that deviate from the corresponding application profile with the upload module.

7. The method of claim 1, wherein dynamically generating the application profile includes:
    extracting privilege tuples that describe a program point, a resource, and an access right from the empirical information with a privilege profiler module;
    characterizing each of the privilege tuples as one of a constant tuple, a variable tuple, and a not-yet-categorized tuple with the privilege profiler module; and
    updating the application profile with the characterized tuples.

8. The method of claim 7, dynamically generating the application profile includes correlating the privilege tuples from different ones of the application instances executing on the plurality of instances of the platform by identifying multiple privilege tuples that include the same program point and access rights to generate a single privilege tuple characterizing a single abstract resource.

9. The method of claim 7,
    wherein extracting the privilege tuples comprises extracting the privilege tuples from the empirical information according to a description file loaded into the privilege profiler module, and
    wherein characterizing each of the privilege tuples comprises characterizing each of the privilege tuples according to the description file loaded into the privilege profiler module.

10. The method of claim 7, wherein characterizing each of the privilege tuples includes:
    correlating the privilege tuples by determining whether multiple privilege tuples include the same program point and access rights to generate a single privilege tuple from the multiple matching privilege tuples characterizing a single abstract resource;
    determining whether the remaining correlated privilege tuples references one of a plurality of constant strings;
    characterizing each of the remaining correlated privilege tuples as a constant tuple based on the determination that the privilege tuple references one of the plurality of constant strings;
    characterizing each of the remaining correlated privilege tuples as a variable tuple based on the determination that multiple privilege tuples include the same program counter and access rights; and
    characterizing each of the remaining correlated privilege tuples as a not-yet-categorized tuple based on the determination that multiple privilege tuples do not include the same program counter and access rights.

11. The method of claim 1, further comprising transmitting the application profile generated by the EPP system to a plurality of client devices.

12. The method of claim 11, further comprising utilizing the application profile within each of the client devices to enable one or more of detection of system intrusions, monitoring of privilege use by the plurality of software application instances, and facilitating development of the software application.

13. A method comprising:
    capturing empirical information relating to the exercise of privileges by a software application instance executing within a client device;
    logging the empirical information to a log file with a wrapper included within the client device; and
    uploading the log file from the client device to an empirical privilege profiler (EPP) system external to the client device with an upload module executing within the client device to facilitate the generation of an application profile that describes the aggregate exercise of privileges by the software application instance.

14. The method of claim 13, wherein capturing the empirical information includes capturing empirical information relating to the exercise of system-level privileges by the software application instance executing within the client devices.

15. The method of claim 13, wherein capturing the empirical information includes capturing one or more of contents of any file handles or other nested structures, a return status, and argument values from an invocation of a kernel reference module and a program counter of the calling one of the plurality of software application instances.

16. The method of claim 13, wherein logging the empirical information includes logging the empirical information to a log file according to extensible markup language (XML) specification with a wrapper that encases one of a Microsoft Windows digital link library (DLL) structure that references the Windows operating system kernel, a UNIX operating system kernel, and a Linux operating system kernel, a Mac operating system kernel from Apple Computer, and a Java Virtual Machine.

17. The method of claim 16, wherein logging the empirical information includes logging the empirical information to the log file according to XML specifications with a wrapper that encases a Microsoft Windows digital link library (DLL) structure that references the Windows operating system kernel.

18. The method of claim 16, wherein logging the empirical information includes logging the empirical information to the log file according to XML specifications with a wrapper that encases a UNIX operating system kernel reference structure.

19. The method of claim 16, wherein logging the empirical information includes logging the empirical information to the log file according to XML specifications with a wrapper that encases a Linux operating system kernel reference structure.

20. The method of claim 13, wherein uploading the plurality of log miles includes:
 determining whether the plurality of log files includes empirical information describing privileges that deviate from the application profile with the upload module; and
 uploading only a portion of the empirical information that described privileges that deviate from the application profile.

21. A method comprising:
 receiving information relating to the exercise of privileges by a plurality of software application instances executing on top of a plurality of instances of a platform residing within a plurality of client devices via log files uploaded by the plurality of client devices; and
 executing computer-implemented privilege profiling software to dynamically generate an application profile that describes the aggregate exercise of privileges by the plurality of software application instances based the uploaded log files.

22. The method of claim 21,
 wherein the log files record kernel calls by each of the plurality of software application instances executing on top of the plurality of instances of the platform residing within the plurality of client devices,
 wherein dynamically generating the application profile comprises dynamically generating the application profile with the EPP system by correlating the kernel calls that are made from the application instances executing on different ones of the client devices.

23. The method of claim 21, wherein dynamically generating the application profile includes:
 extracting privilege tuples that describe a program point, a resource, and an access right from the empirical information with a privilege profiler module included within the EPP system;
 characterizing each of the privilege tuples as one of a constant tuple, a variable tuple, and a not-yet-categorized tuple with the privilege profiler module; and
 updating the application profile with the characterized tuples.

24. The method of claim 23,
 wherein extracting the privilege tuples comprises extracting the privilege tuples from the empirical information according to a description file loaded into the privilege profiler module, and
 wherein characterizing each of the privilege tuples comprises characterizing each of the privilege tuples according to the description file loaded into the privilege profiler module.

25. The method of claim 23, wherein characterizing each of the privilege tuples includes:
 correlating the privilege tuples by determining whether multiple privilege tuples include the same access rights and the same program point of different ones of the application instances executing on different ones of the client devices to generate a single privilege tuple from the multiple matching privilege tuples characterizing a single abstract resource;
 determining whether the remaining correlated privilege tuples reference one of a plurality of constant strings;
 characterizing each of the remaining correlated privilege tuples as a constant tuple based on the determination that the privilege tuple references one of the plurality of constant strings;
 characterizing each of the remaining correlated privilege tuples as a variable tuple based on the determination that multiple privilege tuples include the same program counter and access rights; and
 characterizing each of the remaining correlated privilege tuples as a not-yet-categorized tuple based on the determination that multiple privilege tuples do not include the same program counter and access rights.

26. The method of claim 23, further comprising transmitting the application profile generated by the EPP system to the plurality of client devices with the EPP system.

27. A system comprising:
 a plurality of client computing devices that capture empirical information relating to the exercise of privileges by a plurality of software application instances executing on top of a plurality of instances of a platform residing within the plurality of client computing devices; and
 an empirical privilege profiler system that dynamically generates an application profile that describes the aggregate exercise of privileges by the plurality of software application instances based the empirical information.

28. The system of claim 27,
 wherein the plurality of client computing devices capture the empirical information by capturing empirical information relating to the exercise of system-level privileges by the plurality of software application instances executing on top of the plurality of instances of the platform residing within the plurality of client computing devices, and
 wherein the EPP system dynamically generates the application profile by dynamically generating the application profile that describes the aggregate exercise of system-level privileges by the plurality of software application instances based on the empirical information.

29. The system of claim 27, wherein the plurality of client computing devices capture empirical information by capturing one or more of contents of any file handles or other nested structures, a return status, and argument values from an invocation of a kernel reference module and a program counter of the calling one of the plurality of software application instances.

30. The system of claim 27, wherein the plurality of client computing devices each comprise:
 a wrapper that logs the empirical information to a plurality of log files; and
 an upload module that uploads the plurality of log files to the EPP system.

31. The system of claim 30, wherein the EPP system dynamically generates the application profile by dynamically generating in real-time an application profile based on the uploaded plurality of log files uploaded to the EPP system by the upload module.

32. The system of claim 30, wherein the upload module uploads the plurality of log files by:
   determining whether the plurality of log files includes empirical information describing privileges that deviate from the corresponding application profile; and
   uploading only a portion of the empirical information that described privileges that deviate from the corresponding application profile.

33. The system of claim 27, wherein the EPP system comprises a privilege profiler module that dynamically generates the application profile by:
   extracting privilege tuples that describe a program point, a resource, and an access right from the empirical information;
   characterizing each of the privilege tuples as one of a constant tuple, a variable tuple, and a not-yet-categorized tuple; and
   updating the application profile with the characterized tuples.

34. The system of claim 33,
   wherein the privilege profiler module extracts the privilege tuples by extracting the privilege tuples from the empirical information according to a description file loaded into the privilege profiler module, and
   wherein the privilege profiler module characterizes each of the privilege tuples by characterizing each of the privilege tuples according to the description file loaded into the privilege profiler module.

35. The system of claim 33, wherein the privilege profiler module characterizes each of the privilege tuples by:
   correlating the privilege tuples for the application instances executing within different ones of the client computing devices by determining whether multiple privilege tuples include the same program point and access rights to generate a single privilege tuple from the multiple matching privilege tuples characterizing a single abstract resource;
   determining whether the remaining correlated privilege tuples reference one of a plurality of constant strings;
   characterizing each of the remaining correlated privilege tuples as a constant tuple based on the determination that the privilege tuple references one of the plurality of constant strings;
   characterizing each of the remaining correlated privilege tuples as a variable tuple based on the determination that multiple privilege tuples include the same program counter and access rights; and
   characterizing each of the remaining correlated privilege tuples as a not-yet-categorized tuple based on the determination that multiple privilege tuples do not include the same program counter and access rights.

36. The system of claim 27, wherein the EPP system further transmits the application profile generated by the EPP system to the plurality of client computing devices.

37. The system of claim 36, wherein the plurality of client computing devices utilize the application profile for one or more of system intrusion detection purposes, application privilege use monitoring purposes, and development purposes.

38. A device comprising:
   a processor:,
   a software application instance executing on the processor;
   a memory to store a log file;
   a wrapper that captures empirical information relating to the exercise of privileges by the software application instance and logs the empirical information to the log file; and
   an upload module executing on the processor to upload the log file to an empirical privilege profiler (EPP) system external to the device to facilitate the generation of an application profile that describes the aggregate exercise of privileges by the software application instance.

39. The device of claim 38, wherein the wrapper captures the empirical information by capturing empirical information relating to the exercise of system-level privileges by the software application instance executing within the device.

40. The device of claim 38, wherein the wrapper captures the empirical information by capturing one or more of contents of any file handles or other nested structures, a return status, and argument values from an invocation of a kernel reference module and a program counter of the calling one of the plurality of software application instances.

41. The device of claim 38, wherein the wrapper logs the empirical information by logging the empirical information to a log file according to extensible markup language (XML) specification.

42. The device of claim 38, wherein the wrapper encases one of a Microsoft Windows digital link library (DLL) structure that references the Windows operating system kernel, a system call interface that references the UNIX operating system kernel, and a Linux operating system kernel, a Mac operating system kernel from Apple Computer, and a Java Virtual Machine.

43. The device of claim 38, wherein the upload module uploads the plurality of log files by:
   determining whether the plurality of log files includes empirical information describing privileges that deviate from the application profile; and
   uploading only a portion of the empirical information that described privileges that deviates from the corresponding application profile.

44. A system comprising:
   a memory that stores log files of empirical information relating to the exercise of privileges by a plurality of software application instances executing on top of a plurality of instances of a platform residing within a plurality of client computing devices; and
   a privilege profiler module that dynamically generates an application profile that describes the aggregate exercise of privileges by the plurality of software application instances based empirical information with an empirical privilege profiler (EPP) system.

45. The system of claim 44, wherein the privilege profiler module dynamically generates the application profile by dynamically generating in real-time the application profile that described the aggregate exercise of system-level privileges by the plurality of software application instances based on the log files.

46. The system of claim 45, wherein the privilege profiler module dynamically generates the application profile by:
   extracting privilege tuples that describe a program point, a resource, and an access right from the empirical information;
   characterizing each of the privilege tuples as one of a constant tuple, a variable tuple, and a not-yet-categorized tuple; and
   updating the application profile with the characterized tuples.

47. The system of claim 46, wherein the privilege profiler extracts the privilege tuples by extracting the privilege tuples from the empirical information according to a description file loaded into the privilege profiler module and characterizes each of the privilege tuples by characterizing each of the privilege tuples according to the description file loaded into the privilege profiler module.

48. The system of claim 47, wherein the privilege profiler module characterizes each of the privilege tuples by:
   correlating the privilege tuples by determining whether multiple privilege tuples for software application instances executing ones of the client computing devices include the same program point and access rights to generate a single privilege tuple from the multiple matching privilege tuples characterizing a single abstract resource;
   determining whether the remaining correlated privilege tuples references one of a plurality of constant strings;
   characterizing each of the remaining correlated privilege tuples as a constant tuple based on the determination that the privilege tuple references one of the plurality of constant strings;
   characterizing each of the remaining correlated privilege tuples as a variable tuple based on the determination that multiple privilege tuples include the same program counter and access rights; and
   characterizing each of the remaining correlated privilege tuples as a not-yet-categorized tuple based on the determination that multiple privilege tuples do not include the same program counter and access rights.

49. The system of claim 44, wherein the privilege profiler module further transmits the application profile generated by the EPP system to the plurality of client computing devices.

50. A computer-readable storage medium comprising instructions for causing a programmable processor to:
   capture empirical information relating to the exercise of system-level privileges by a plurality of software application instances executing on top of a plurality of instances of a platform residing within a plurality of client computing devices; and
   dynamically generate an application profile that describes the aggregate exercise of system-level privileges by the plurality of software application instances based the empirical information with an empirical privilege profiler (EPP) system.

51. The computer-readable storage medium of claim 50, further comprising instruction that cause the processor to upload the empirical information by:
   determining whether the empirical information includes empirical information describing privileges that deviate from the corresponding application profile; and
   uploading only the portion of the empirical information describing privileges that deviate from the corresponding application profile.

52. The computer-readable storage medium of claim 50, wherein the instructions cause the processor to dynamically generate the application profile by:
   extracting privilege tuples that describe a program point, a resource, and an access right from the empirical information with a privilege profiler module included within the EPP system;
   characterizing each of the privilege tuples as one of a constant tuple, a variable tuple, and a not-yet-categorized tuple with the privilege profiler module; and
   updating the application profile with the characterized tuples.

53. The computer-readable storage medium of claim 50, further comprising instructions that cause the programmable processor to utilize the application profile to enable one or more of detection of system intrusions, monitoring of privilege use by the plurality of software application instances, and facilitating development of the software application.

* * * * *